United States Patent Office 3,550,373
Patented Dec. 29, 1970

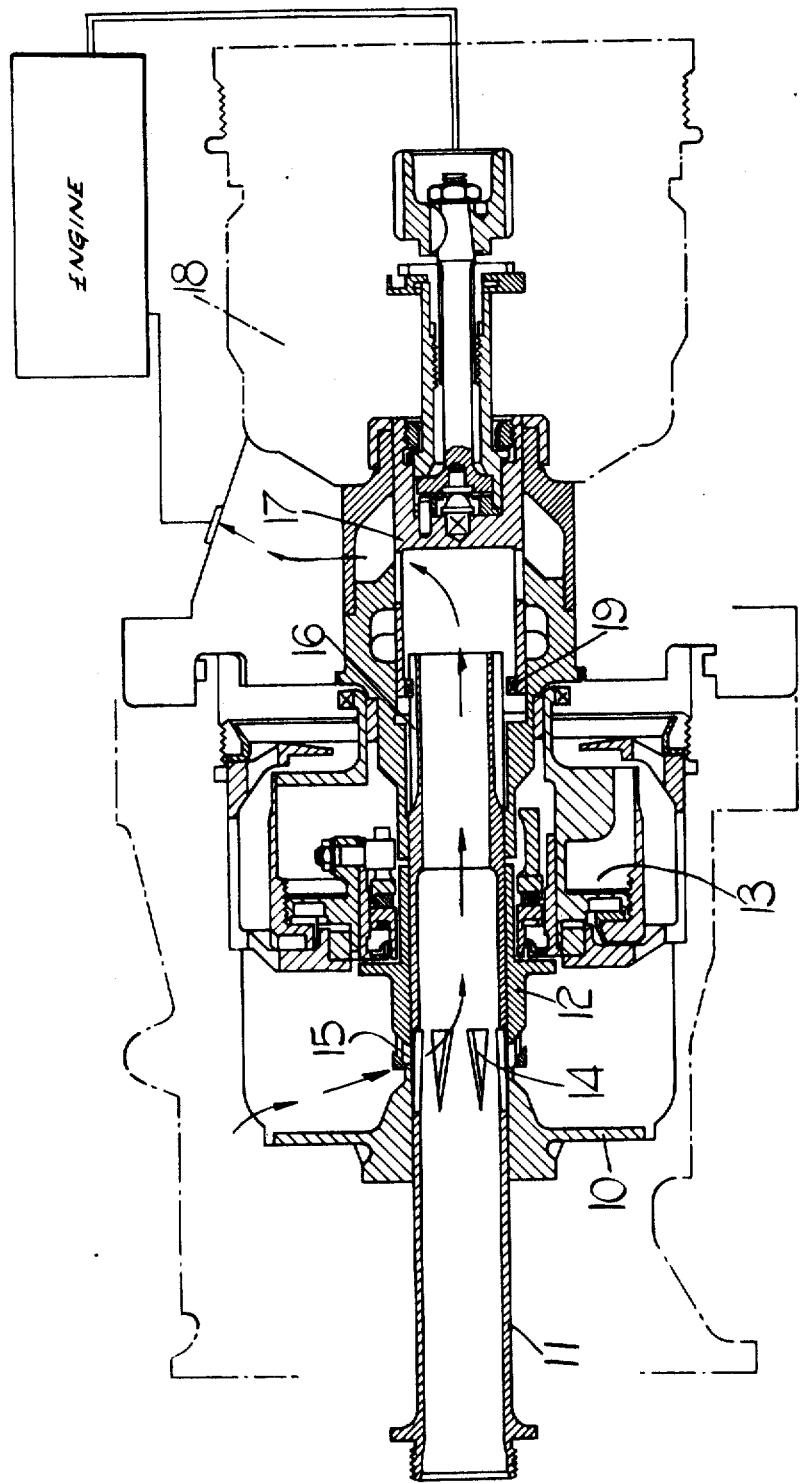

3,550,373
FUEL SYSTEMS FOR GAS TURBINE ENGINES
Joseph Lewis Bloom, Baie d'Urfe, Quebec, Canada, assignor to Joseph Lucas (Industries) Limited, Birmingham, England
Filed July 9, 1968, Ser. No. 743,467
Int. Cl. F01c *17/06;* F02c *9/08;* F16k *29/02*
U.S. Cl. 60—39.28                                 1 Claim

ABSTRACT OF THE DISCLOSURE

A device for controlling fuel flow to a gas turbine engine comprises a tubular member having apertures through which fuel flows to the engine, a fixed sleeve, an axially movable sleeve surrounding the tubular member to determine the fuel flow rate, the member being rotatable from the engine through a part, the member and part having interengaging portions whereby relative rotary movement between the member and part occurs as they rotate.

---

This invention relates to a device for controlling the flow of fuel to a gas turbine engine, the device being of the kind comprising a tubular member through which fuel must flow to the engine, said member having at least one aperture in its wall, a fixed sleeve within which the member is axially slidable in response to changes in an engine parameter, and an axially slidable sleeve surrounding the member, said slidable sleeve being movable by a speed responsive governor, the arrangement being such that the axial positions of the member and slidable sleeve determines the effective area of the aperture exposed between the two sleeves, and through which fuel can flow to the engine.

In connection with such flow controlling devices, it has been proposed to arrange for the tubular member to be rotated by the engine whilst the latter is operating so to avoid static friction between the member and the two sleeves.

The object of the present invention is to provide convenient means for effecting such rotation, and whereby chances of local wear upon the member due to the device operating for long periods at one axial setting of the member, will be minimised.

According to the invention in a device of the kind specified the member is arranged to be rotated by a part rotatable with the engine, the member and part having interengaging portions which partake of movement relative to one another as the member is rotated.

The accompanying drawing is a longitudinal sectional view of one example of the invention.

In the drawing, 10 is a fixed sleeve in which a tubular member 11 is axially slidable by means (not shown) responsive to a pressure derived from the engine compressor, such means being connected to the left hand end of the member 11 as viewed in the drawing.

Surrounding the member 11 is a sleeve 12 which is axially movable by an engine speed responsive governor generally designated 13. Moreover, in the wall of the member 11 is formed a plurality of angularly spaced and longitudinally tapering apertures 14 through which fuel can enter the member between the sleeves 10 and 12.

Conveniently, as shown, the sleeve 12 has an end portion which overlaps the sleeve 10 and is provided with a gap 15 the effective width of which is determined by the axial setting of the sleeve 12. Since the axial setting of the member 11 determines the widths of apertures 14 which are exposed to the gap 15, the total area through which fuel can enter the member 11 on its way to the engine is determined, not only by the axial position of the sleeve 12, but also by the axial position of the member 11.

In order to avoid static friction between the member 11 and the sleeve 10 and 12, the member 11 is arranged to be rotated by the engine. For this purpose the end of the member 11, remote from the aforementioned pressure responsive means, is provided with external teeth 16 of substantial axial length. This end of the member 11 is surrounded by a hollow cylindrical part 17 which is arranged to be rotated from the gear 18 by the engine (not shown). The axis of rotation of the part 17 is parallel to, but slightly off-set, from the axis of rotation of the member 11. Moreover, on the interior of the part 17 is an annular row of teeth 19 which are arranged to mesh in turn with the teeth 16 as the part and member rotate.

Due to the eccentricity of the part 17 relative to the member 11, the part and member are rotated at different speeds, and therefore partake of relative movement whilst the engine is operating. This relative movement tends to minimise localised wear or fretting of the teeth when the engine is operating for long periods with the member 11 at one axial setting.

Having thus described my invention what I claim as new and desire to secure by Letters Patent is:

1. A device for controlling the flow of fuel to a gas turbine engine, comprising a tubular member through which fuel flows to the engine, the tubular member having at least one aperture in its wall through which the fuel flows, a fixed sleeve within which the tubular member is axially slidable, and an axially slidable sleeve within which the tubular member is also slidable, the relative axial positions of the tubular member and said sleeve controlling the area of said aperture which is available for flow, and a part drivingly connected to the engine for rotating said tubular member, and the tubular member and said part having respective interengaging driving portions, one of which is a toothed internal annulus and the other of which is externally toothed and said portions being rotatable about respective parallel but off set axes whereby relative rotation takes place between said portions.

References Cited

UNITED STATES PATENTS

| | | | |
|---|---|---|---|
| 3,076,310 | 2/1963 | Gayfer et al. | 60—39.28 |
| 3,177,921 | 4/1965 | Turner | 60—39.28 |
| 3,199,290 | 8/1965 | Jubb et al. | 60—39.28 |
| 3,327,759 | 6/1967 | Lewis | 60—39.28X |

FOREIGN PATENTS

| | | | |
|---|---|---|---|
| 977,823 | 12/1964 | Great Britain | 137—331 |

AL LAWRENCE SMITH, Primary Examiner

U.S. Cl. X.R.

137—331